United States Patent [19]
Martin

[11] Patent Number: 5,974,573
[45] Date of Patent: Oct. 26, 1999

[54] METHOD FOR COLLECTING ECC EVENT-RELATED INFORMATION DURING SMM OPERATIONS

[75] Inventor: Todd R. Martin, Bastrop, Tex.

[73] Assignee: Dell USA, L.P., Round Rock, Tex.

[21] Appl. No.: 08/924,193

[22] Filed: Sep. 5, 1997

Related U.S. Application Data

[63] Continuation of application No. 08/587,082, Jan. 16, 1996, abandoned.

[51] Int. Cl.$^6$ .................................................. G06F 11/00
[52] U.S. Cl. ............................................................ 714/48
[58] Field of Search ........................... 395/184.01, 183.1, 395/183.21, 183.12, 185.05, 185.1, 733

[56] References Cited

U.S. PATENT DOCUMENTS

| | | | |
|---|---|---|---|
| 3,873,819 | 3/1975 | Greenwald | 395/184.01 |
| 4,209,846 | 6/1980 | Seppa | 395/185.05 |
| 4,255,808 | 3/1981 | Schaber | 395/185.07 |
| 4,780,809 | 10/1988 | Woffinden et al. | 395/185.01 |
| 4,821,178 | 4/1989 | Levin et al. | 395/184.01 |
| 4,932,028 | 6/1990 | Katircioglu et al. | 395/183.21 |
| 5,245,615 | 9/1993 | Treu | 395/183.21 |
| 5,402,431 | 3/1995 | Saadeh et al. | 371/67.1 |
| 5,463,775 | 10/1995 | DeWitt et al. | 395/184.01 |
| 5,499,340 | 3/1996 | Barritz | 395/184.01 |
| 5,537,541 | 7/1996 | Wibecan | 395/183.13 |
| 5,551,044 | 8/1996 | Shah et al. | 395/750 |
| 5,564,015 | 10/1996 | Bunnell | 395/184.01 |
| 5,566,337 | 10/1996 | Szymanski et al. | 395/733 |
| 5,611,044 | 3/1997 | Lundeby | 395/183.14 |

OTHER PUBLICATIONS

Ralston et al., ed., Encyclopedia of Computer Science, 3rd ed., pp. 531–532, 1992.

Intel Corp., "Intel386 SL Microprocessor Superset Programmer's Refernce Manual", pp. 6–1–6–54, 1992.

*Primary Examiner*—Robert W. Beausoliel, Jr.
*Assistant Examiner*—Pierre E. Elisca
*Attorney, Agent, or Firm*—Haynes and Boone, LLP

[57] ABSTRACT

A method for operating a computer system and an associated method for collecting information related to the operation of the computer system. An ECC count and a series of address/time/temperature entries is maintained in a memory of the computer system. The computer system is continuously monitored for occurrences of an SMM event. Upon detection of an SMM event, the computer system enters SMM mode where SMM handler code is executed until handling of the SMM event is complete. The SMM handler code includes special instructions which enable the collection of information related to the operation of the computer system. Specifically, a determination is made as to whether the SMM event was caused by an ECC event. If so, the address at which the ECC event occurred and the time and temperature when the ECC event occurred are acquired, the ECC count is incremented and the acquired address, time and temperature information is stored as an entry in the memory.

22 Claims, 1 Drawing Sheet

METHOD FOR COLLECTING ECC EVENT-RELATED INFORMATION DURING SMM OPERATIONS

This is a continuation of application Ser. No. 08/587,082 filed on Jan. 16, 1996, now abandoned.

BACKGROUND OF THE INVENTION

1. Field of the Invention

The present invention generally relates to a method for collecting information related to system errors which occur in a computer system and, more particularly, to a method of collecting error correction code event-related information while the computer system is executing system management mode handler code.

2. Description of Related Art

An error occurs whenever a computer system such as a personal computer (or "PC") produces an incorrect result. The cause of computer errors varies and may include malfunctions of physical components and coding errors in software. As a result, nearly all computer systems are equipped with error detecting and/or error correcting capabilities. Error detecting code commonly uses parity checks to determine if there is an error in a received message. More specifically, a parity bit is added to the end of a message block. Upon receipt, the message block is checked to see if it contains the correct number of ones. If there are not the correct number of ones in the message block, the message contains an odd number of errors. Upon detection of an error, the receiver can request that the message be retransmitted. In most cases, the retransmission will result in an error free message.

Error detection techniques are generally disfavored because of the additional time consumed by retransmissions of those messages containing errors. Additionally, error detection requires a two-way exchange in order to request and process the retransmission of a message. The aforementioned deficiencies associated with error detection techniques are overcome by the use of techniques which incorporate error correcting code (or "ECC"). Generally speaking, ECC techniques assign a parity check to those positions in a code that have a one in the rightmost position of their binary position, a second parity check for those positions that have a one in their second to right position, etc. When a single error occurs, exactly those parity checks will fail for which the binary expansion of the position of the error has ones.

Thus, the pattern of the parity-check failures points directly to the position of the error. Once identified, the erroneous bit may be changed to its opposite value, thereby correcting the error. Further details regarding error detecting and error correcting codes may be found by reference to Ralston et al., ed., *Encyclopedia of Computer Science*, 3rd ed., pgs. 531–532 (1992).

While message errors are often isolated and/or random occurrences, they may be symptomatic of a greater problem in need of rectification.

Unfortunately, ECC techniques are self-correcting. Thus, after a message error has been corrected, no record of the error remains. It is clear, therefore, that information regarding ECC errors would be quite useful in the diagnosis and/or repair of a computer system, particularly if such information could be collected with minimal impact on the operations of the computer system.

As described in the *Intel386™ Microprocessor SuperSet Programmer's Reference Manual*, the Intel family of microprocessors (386 series or higher), as well as clones of these microprocessors, are provided with a hidden set of instructions commonly referred to as system management mode (or "SMM") code. SMM code was developed in order to provide a means of transparently managing system operations for a computer system. Generally, a computer system equipped with SMM code will operate normally until the occurrence of an SMM event, i.e., an event which will initiate execution of the SMM code. For example, a low battery condition in a laptop computer is an SMM event which will initiate execution of the SMM code. When an SMM event occurs, a system management interrupt (or "SMI") request is transmitted to the central processing unit (or "CPU"). Upon receipt of an SMI request, the highest priority non-maskable interrupt, the CPU saves its state in a specially allocated portion of main memory, exits the normal operating mode and enters SMM mode where the CPU begins to execute the SMM code. The CPU will stay in SMM mode until the SMI request is handled. At that time, the CPU will return to the normal operating mode.

Broadly speaking, SMM mode provides a process to transparently handle SMM events, a varied collection of types of events which includes the aforementioned ECC events. Once an event is handled and the CPU returns to normal operating mode, however, information related to the SMM event is not retained. Thus, the user is deprived of useful information which could later be reviewed, for example, while running a separate application or diagnostics on the computer system.

It can be readily seen from the foregoing that it would be desirable to a provide a method of operating a computer system such that information related to its operation is collected whenever the computer enters SMM mode in response to the occurrence of an event, for example, a system error, for which information is to be collected. It is, therefore, the object of this invention to provide such a method of operating a computer system.

SUMMARY OF THE INVENTION

In one embodiment, the present invention is of a method for collecting information related to the operation of a computer system. A log containing information related to occurrences of a first type of event is maintained in a memory of the computer system. The computer system is continuously monitored for occurrences of a second type of event which is potentially causable by the first type of event. Each time an occurrence of an event of the second type is detected, a determination is made whether the event was caused by an event of the first type. If so, information related to the event is collected and stored as an entry in the log. In one aspect thereof, a count of occurrences of the first type of event is also maintained in the log. Each time an event of the first type occurs, the count is incremented. In alternate further aspects thereof, the address at which the event occurred, the time at which the event occurred and/or the operating temperature of the computer system when the event occurred are stored as the entry in the log. In one particular aspect thereof, the first type of event is a system error. In still other aspects thereof, the first type of event is an ECC event while the second type of event is an SMM event.

In another embodiment, the present invention is of a method for collecting information related to operations of a computer system configured to perform SMM operations. Occurrences of SMM operations are detected and, if the SMM event is determined to have been caused by an ECC event, an indicator of the ECC event is stored in memory. In one aspect thereof, SMM events are detected by determining if the CPU has entered SMM mode. In another aspect thereof, the indictor of the ECC event is a count of ECC events which is stored in memory and incremented each time an SMM event caused by an ECC event is detected. In alternate aspects thereof, the indicator of the ECC event may further include a record of the addresses at which ECC events occurred, the times at which ECC events occurred and/or the operating temperature of the computer system when the ECC event occurred. In these aspects, for each occurrence of an ECC event, the address at which the ECC event occurred, the time at which the ECC event occurred and the operating temperature of the computer system when the ECC event occurred are recorded in the memory.

In another embodiment, the present invention is of a method of operating a computer system in which the computer system runs in a normal operating mode until the CPU receives an SMI request. Upon receipt of the SMI request, the CPU switches from the normal operating mode into SMM mode. Once in SMM mode, the CPU executes SMM code until the CPU services the SMI request. Upon servicing the SMI request, the CPU will switch from the SMM mode to the normal operating mode. While executing SMM code, the CPU determines if the SMI request was caused by a system error. If the SMI request was caused by a system error, information related to the system error is stored in memory. In one aspect thereof, the system error is an ECC event. In another aspect thereof, the information related to the ECC event is stored in a log. In alternate further aspects thereof, the information stored in the log includes a count of ECC events, a series of address entries, a series of time entries and a series of operating temperature entries. If an ECC count is maintained in the log, the count is incremented each time an ECC event occurs. If addresses, times and/or operating temperatures are maintained in the log, the address at which each ECC event occurs, the time at which each ECC event occurs and/or the operating temperature of the computer system at the time of the ECC events are recorded as entries in the log.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1:
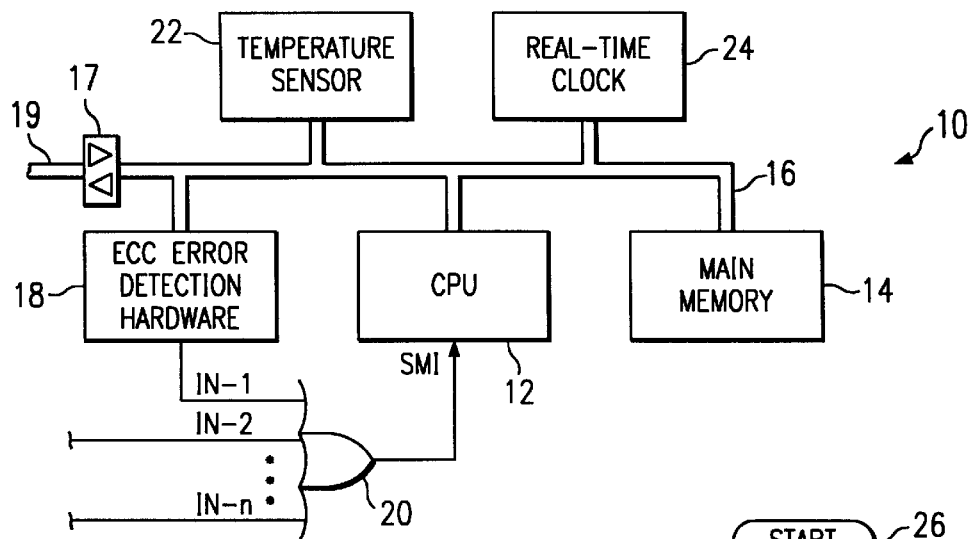
FIG. 1 is a block diagram of a computer system configured to collect information related to ECC events in accordance with the method of the present invention.

Referring first to FIG. 1, a computer system 10 configured to collect information related to system errors such as ECC events will now be described in greater detail. The computer system 10 includes a local bus 16 for bi-directional exchanges of address, data and control signals between various components of the computer system 10 such as CPU 12 and main memory 14. The CPU 12 may be selected from any of the various processors configured to operate in SMM mode. For example, a type P6 Pentium processor manufactured by Intel Corporation of Santa Clara, Calif. would be suitable for the uses contemplated herein. The main memory 14 includes the total addressable space, other than auxiliary memory, for the computer system 10.

While omitted from FIG. 1 for ease of illustration, it should be clearly understood that various devices other than those specifically shown in FIG. 1 also reside on the local bus 16. These devices include a memory controller for controlling the exchange of messages between the CPU 12 and the main memory 14, a cache which holds data and instructions obtained from the main memory 14 for next use by the CPU 12 and a controller for controlling the exchange of messages between devices residing on the local bus 16, for example, the CPU 12, and devices residing on a system bus 19 coupled to the local bus 16 by bridge 17.

Preferably, the controller is a peripheral connection interface (or "PCI") controller and the system bus 19 is a 32-bit wide PCI bus having a transfer rate on the order of 33 MBytes per second. It is fully contemplated, however, that, in alternate embodiments of the invention not illustrated in FIG. 1, the system bus 19 may be a 32-bit wide extended industry standard architecture (or "EISA") bus or a 16-bit wide industry standard architecture (or "ISA") bus. While also omitted from FIG. 1 for ease of illustration, it should be further understood that various devices typically reside on the PCI bus 19. These devices include a main basic input output system (or "BIOS") 24 as well as various peripheral devices such as an auxiliary memory.

Also coupled to the local bus 16 is ECC error detection hardware 18, a temperature sensor 22 and a real-time clock 24. It should be clearly understood, however, that while the exemplary embodiment of the invention illustrated in FIG. 1 shows the ECC error detection hardware 18, the temperature sensor 22 and the real-time clock 24 as directly mounted to the local bus 16, the term "coupled" is intended to encompass those embodiments of the invention, not illustrated in FIG. 1, where the aforementioned devices are not directly mounted to the local bus 16. For example, any or all of the ECC error detection hardware 18, temperature sensor 22 and real-time clock 24 may reside on the PCI bus 19.

The ECC error detection hardware 18 examines messages for the presence of transmission errors and replaces any messages containing errors with a corrected message. While illustrated as a separate device, it should be noted that the ECC error detection hardware 18 is typically incorporated in the devices which control the exchange of messages. For example, the ECC error detection hardware 18 would be incorporated in the PCI controller which controls the exchange of messages between the CPU 12 and devices residing on the PCI bus 19. Additionally, ECC error detection hardware 18 would also be incorporated in the memory controller which controls the exchange of messages between the CPU 12 and the main memory 14. The temperature sensor 22 monitors the operating temperature inside the chassis which houses the computer system 10. The real time clock 24 monitors elapsed time and reports the time of execution of various operations to the CPU 12.

Upon receipt of an SMI request, the CPU 12 switches from normal mode into SMM mode upon receipt of an SMI request. SMI requests are generated by logical circuitry 20. The logical circuitry includes a series of input lines, IN-1 through IN-n, each respectively coupled to hardware designed to generate a notification of an event to the logical circuitry 20. The input line IN-1 is coupled to the ECC error detection hardware 18. When an ECC error is detected, the ECC error detection hardware 18 transmits an indication of the error detection to the logical circuitry 20 via the input line IN-1, for example, by asserting the input line IN-1.

Input lines IN-2 through IN-n are similarly coupled to hardware designed to generate notification of other events. For example, input line IN-2 may be coupled to an output of a power mode controller. For this example, the power mode controller would notify the logical circuitry 20 of a low power condition by asserting the input line IN-2. Additionally, in the event that the computer system 10 includes plural controllers which respectively incorporate ECC error detection hardware, the logical circuitry 20 may be notified of ECC events detected by such additional ECC error detection hardware by coupling such additional hardware to the logical circuitry 20 in a manner similar to that described herein with respect to the ECC error detection hardware 18.

In the embodiment of the invention illustrated herein, the logical circuitry 20 is comprised of a single OR gate having a series of input lines IN-1 through IN-n and a single output line SMI. Such a configuration would be selected if the logical circuitry 20 is to transmit an SMI request in response to the occurrence of any one of the selected events. Alternately, it may be desired to configure the logical circuitry 20, for example, by adding additional logic gates, such that selected combinations of certain events cause the logical circuitry 20 to generate an SMI request and that isolated occurrence of these certain events do not cause the generation of an SMI request.

In the embodiment of the logical circuitry 20 disclosed herein, the assertion of any one of the input lines IN-1 though IN-n causes the logical circuitry 20 to assert the SMI output line. In response to the assertion of the SMI line, the CPU 12 will switch from normal mode to SMM mode and commence execution of the SMM handler code.

Figure 2:
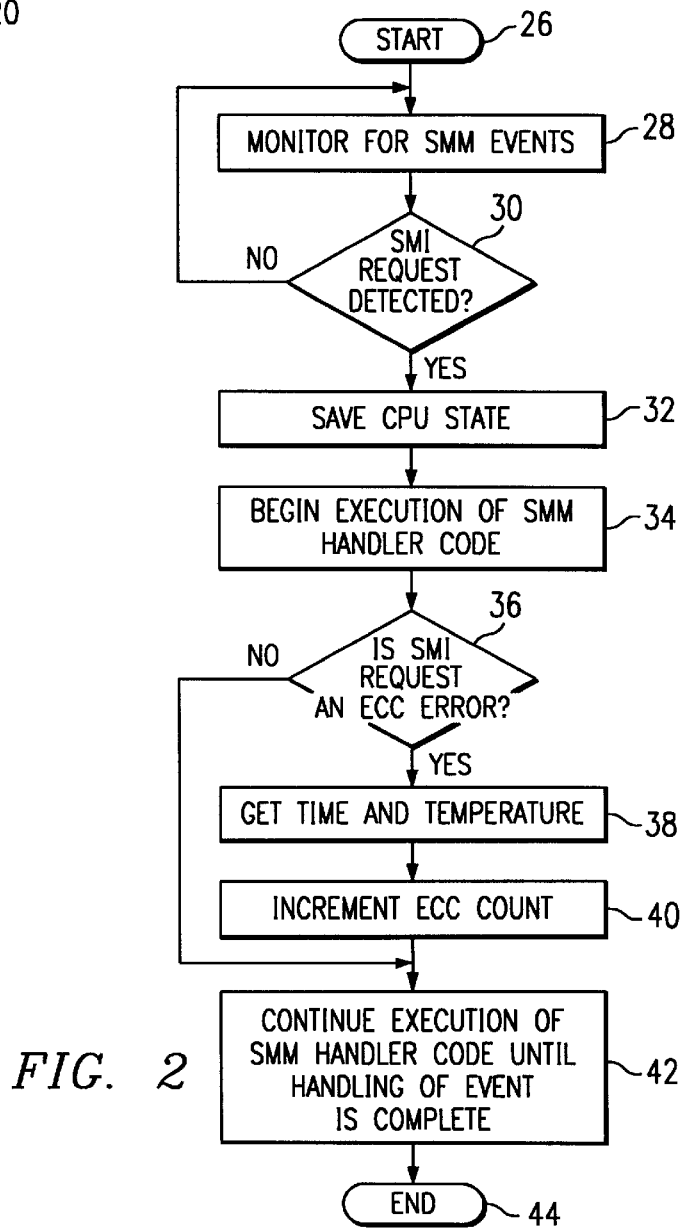
FIG. 2 is a flow chart of a method of operating the computer system of FIG. 1 to collect information related to ECC events while the computer system is executing SMM handler code.

Referring now to FIG. 2, the method of operating the computer system 10 to collect information related to system errors such as ECC events will now be described in greater detail. The method commences at step 26 and, at step 28, the CPU 12 monitors for SMM events by checking the state of the SMI line. Specifically, if the SMI line is deasserted, no SMM events have occurred. Proceeding to step 30, the CPU 12 determines that an SMM event has occurred if the SMI line has been asserted, thereby transmitting an SMI request to the CPU 12. If, however, the SMI line has not been asserted, no SMM event has occurred and the method returns to step 28 to continue to monitor for the occurrence of SMM events.

If an SMI request was detected at step 30, the CPU 12 enters the SMM mode and, proceeding to step 32, the CPU state is saved in SM-RAM space, an allocated portion of the main memory 14. Having saved the existing CPU state, the method proceeds to step 34 where the CPU 12 enters the SMM mode and begins to execute SMM handler code. The SMM handler code is a series of instructions which identifies and processes the received SMI request. For example, in response to particular SMI requests, the SMM handler code may power down an idle device or system, restart a powered down device or system, save the state of a device, stop or restart clock to a device, slow down clock to a device, stop oscillators, enable slow DRAM refresh, turn power off to cache memory or handle power failure and security protection. Once the request is handled, the SMM handler returns the CPU 12 to normal operating mode.

As previously stated, SMM operations are transparent and, once handled, a computer user will be unaware that an event occurred. Accordingly, the objective of present invention is to collect selected information related to a particular event, the occurrence of which will cause the logical circuitry 20 to generate an SMI request. To achieve the aforementioned objective, the present invention is directed to a proposed modification of the SMM handler code such that the desired information may be collected.

Specifically, proceeding to step 36, a determination is made as to whether the SMI request was caused by an ECC event, i.e., the detection and correction of an ECC error. As previously stated, the ECC error detection hardware 18 is incorporated a controller, for example, a memory controller which controls the exchange of messages between the CPU 12 and the main memory 14 or a PCI controller which controls the exchange of messages between the CPU 12 and devices, such as an auxiliary memory, which reside on the PCI bus 19. Each controller in which the ECC error detection hardware 18 is incorporated further includes an ECC register (not shown) which is toggled when an ECC error is detected and corrected during the transmission of a message. To determine whether the SMI request was caused by an ECC event, the CPU 12 will check the state of the ECC register in each controller which incorporates the ECC error detection hardware 18. If the ECC register in each of these controllers is not set, the CPU 12 determines that the SMI request was not caused by an ECC event and the method of the present invention proceeds to step 42 where the conventional SMM handler code is executed until handling of the non-ECC type SMI request is complete, the CPU 12 returns to normal operating mode and the method ends at step 44.

Returning to step 36, if the ECC register within one of the controllers incorporating the ECC error detection hardware 18 is set, the CPU 12 determines that the SMI request was caused by an ECC event. In this case, the CPU 12 will retrieve an address of the ECC error from the ECC error detection hardware 18 and reset the ECC register. The method of the present invention then proceeds on to step 38 where the CPU 12 polls the temperature sensor 22 to acquire the operating temperature within the chassis of the computer system 10 and polls the real-time clock to determine the time.

Proceeding to step 40, information related to the ECC event is logged. Specifically, a portion of the main memory 14, preferably a non-volatile portion thereof such as FLASH or NVRAM, was previously allocated to include an ECC event log. It is preferred that non-volatile memory is used to retain information related to the ECC event so that, if the ECC event causes the computer system 10 to lose power, information related to the event causing the power loss will be preserved for later examination, for example, when performing diagnostics to determine the cause of the power loss.

Thus, the ECC event log includes an ECC event count, and a series of entries, one for each ECC event included in the ECC event count. Each entry in the ECC event log contains the address of an ECC error and the time and temperature at which that ECC error occurred. Accordingly, at step 40, the ECC event count is incremented by one and the address, time and temperature information respectively acquired at steps 36 and 38 is placed in the next available entry within the log.

Having stored the information related to the detected ECC event, the method of the present invention again proceeds to step 42 which execution of the conventional portion of the SMM handler code continues until handling of the ECC event is complete.

By modifying the SMM handler code in the manner herein described, information related to each ECC event is acquired for storage in the main memory 14. This information may later be retrieved for examination, for example, when running another application or performing diagnostics on the computer system 10. In this manner, information regarding the total number of ECC events, the address of each ECC error causing an ECC event, the time at which each ECC event occurred and the temperature at which each ECC event occurred is available for analysis. Normally, such information is not available for self-correcting events such as ECC events. By providing such information, improved evaluation of the operation of the computer system 10 is possible.

Thus, there has been described and illustrated herein, a computer system which accumulates information related to ECC events, thereby providing additional information regarding the occurrence of such events. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. For a computer system having a memory and a CPU, a method for collecting information related to operation of said computer system, comprising the steps of:

maintaining, in said memory, a log containing information related to occurrences of a first type of event including a count of the occurrences of said first type of event which is incremented each time an event of said first type occurs;

continuously monitoring for occurrences of a second type of event, said second type of event potentially causable by said first type of event;

for each detection of an occurrence of an event of said second type, executing code, stored in said memory, to service said event of said second type, said step of executing code including the step of determining if said detected second type of event was caused by an event of said first type; and if said detected second type of event was caused by an event of said first type, collecting information related to said first type of event including an operating temperature for said computer system when said event occurred, and storing said collected information as an entry in said log;

wherein if said detected second type of event was not caused by an event of said first type, said steps of collecting and storing are not performed.

2. A method for collecting information related to operation of a computer system according to claim 1 wherein the step of collecting information related to said event further comprises the steps of:

determining an address at which said event occurred;

storing said address at which said event occurred as said entry in said log.

3. A method for collecting information related to operation of a computer system according to claim 1 wherein the step of collecting information related to said event further comprises the steps of:

determining a time at which said event occurred; and storing said time at which said event occurred as said entry in said log.

4. A method for collecting information related to operation of a computer system according to claim 1 wherein the step of collecting information related to said event further comprises the steps of:

determining an address at which said event occurred;

determining a time at which said event occurred;

determining an operating temperature for said computer system when said event occurred; and storing said address, time and temperature when said event occurred as said entry in said log.

5. A method for collecting information related to operation of a computer system according to claim 4 wherein said first type of event is a system error.

6. A method for collecting information related to operation of a computer system according to claim 4 wherein said first type of event is an ECC event.

7. A method for collecting information related to operation of a computer system according to claim 6 wherein said second type of event is an SMM event.

8. For a computer system having a memory and a CPU configured to perform SMM operations, a method for collecting information related to operations of said computer system, comprising the steps of:

detecting an SMM event;

executing SMM code stored in said memory until said CPU services said SMM event; said step of executing SMM code stored in said memory further comprising the steps of:

determining if said SMM event was caused by an ECC event; and storing an indicator of said ECC event in memory if said SMM event was caused by an ECC event including an operating temperature for said computer system when said ECC event occurred;

wherein said step of storing is not performed if said SMM event was not caused by an ECC event.

9. A method for collecting information related to operations of a computer system according to claim 8 wherein the step of detecting an SMM event further comprises the step of determining if said CPU enters SMM mode.

10. A method for collecting information related to operations of a computer system according to claim 8 wherein the step of storing an indicator of said ECC event in memory further comprises the steps of:

maintaining a count of ECC events in said memory; and incrementing said count of ECC events each time an SMM event caused by an ECC event is detected.

11. A method for collecting information related to operations of a computer system according to claim 8 wherein the step of storing an indicator of said ECC event in memory further comprises the steps of:

determining an address at which said ECC event occurred;

storing said address at which said ECC event occurred in said memory.

12. A method for collecting information related to operations of a computer system according to claim 8 wherein the step of storing an indicator of said ECC event in memory further comprises the steps of:

determining a time at which said ECC event occurred; and storing said time at which said ECC event occurred in said memory.

13. A method for collecting information related to operations of a computer system according to claim 10 wherein the step of storing an indicator of said ECC event in memory further comprises the steps of:

maintaining an address/time/temperature log and a count of ECC events in said memory;

determining an address and a time at which said ECC event occurred and an operating temperature for said computer system when said ECC event occurred;

incrementing said count of ECC events each time an SMM event caused by an ECC event is detected; and storing said address, said time and said operating temperature in said address/time/temperature log each time an SMM event caused by an ECC event is detected.

14. A method of operating a computer system according to claim 13 wherein said system error is an ECC event.

15. A method of operating a computer system according to claim 14 wherein said information related to said ECC event is stored in a log.

16. A method of operating a computer system according to claim 15 wherein the step of storing information related to said ECC event in said log further comprises the steps of:

maintaining a count of ECC events in said log; and incrementing said count each time an ECC event occurs.

17. A method of operating a computer system according to claim 15 wherein the step of storing information related to said ECC event in said log further comprises the steps of:

determining an address at which said ECC event occurred;

storing said address at which said ECC event occurred as an entry in said log.

18. A method of operating a computer system according to claim 15 wherein the step of storing information related to said ECC event in said log further comprises the steps of:

determining a time at which said ECC event occurred;

storing said time at which said ECC event occurred as an entry in said log.

19. A method of operating a computer system according to claim 15 wherein the step of storing information related to said ECC event in said log further comprises the steps of:

determining an operating temperature for said computer system when said ECC event occurred;

storing said operating temperature as an entry in said log.

20. A method of operating a computer system according to claim 15 wherein the step of storing information related to said ECC event in said log further comprises the steps of:

determining an address at which said ECC event occurred;

determining a time at which said ECC event occurred;

determining an operating temperature for said computer system when said ECC event occurred;

storing said address, time and operating temperature at which said event occurred as an entry in said log.

21. A method of operating a computer system according to claim 15 wherein the step of storing information related to said ECC event in said log further comprises the steps of:

maintaining a count of ECC events and a address/time/temperature table in said log;

determining an address at which said ECC event occurred;

determining a time at which said ECC event occurred;

determining an operating temperature for said computer system when said ECC event occurred;

incrementing said count each time an ECC event occurs; and storing said address, time and temperature at which said event occurred as an entry in said address/time/temperature log.

22. A method of operating a computer system, said computer system including a CPU and a memory, comprising the steps of:

operating said computer system in a normal operating mode until said CPU receives an SMI request:

upon receipt of said SMI request, switching from said normal operating mode into SMM mode;

executing SMM code stored in said memory until said CPU services said SMI request; and upon servicing said SMI request, switching from said SMM mode to said normal operating mode;

wherein said step of executing SMM code stored in said memory further comprises the steps of:

determining if said SMI request was caused by a system error;

if said SMI request was caused by a system error, storing information related to said system error, including an operating temperature for said computer system when said system error occurred, in said memory; and if said SMI request was not caused by a system error, omitting said step of storing.

* * * * *